(No Model.)  5 Sheets—Sheet 1.

E. VAN OSTA.
LEATHER CUTTING MACHINE.

No. 558,864. Patented Apr. 21, 1896.

WITNESSES:
H. J. Dieterich
A. L. Kitchin

INVENTOR
Edouard Van Osta
BY
O'Meara & Co.
ATTORNEYS (No Model.)  5 Sheets—Sheet 3.

E. VAN OSTA.
LEATHER CUTTING MACHINE.

No. 558,864. Patented Apr. 21, 1896.

WITNESSES:
H. J. Dieterich
A. L. Kitchin

INVENTOR
Edouard Van Osta.

BY O'Meara & Co
ATTORNEYS

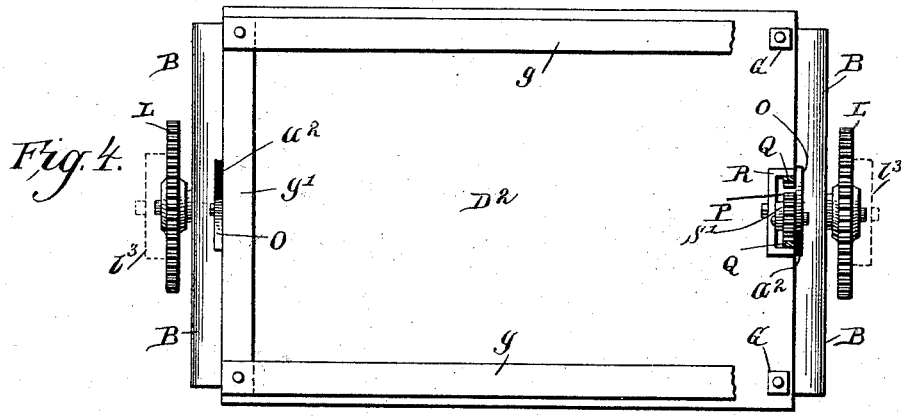
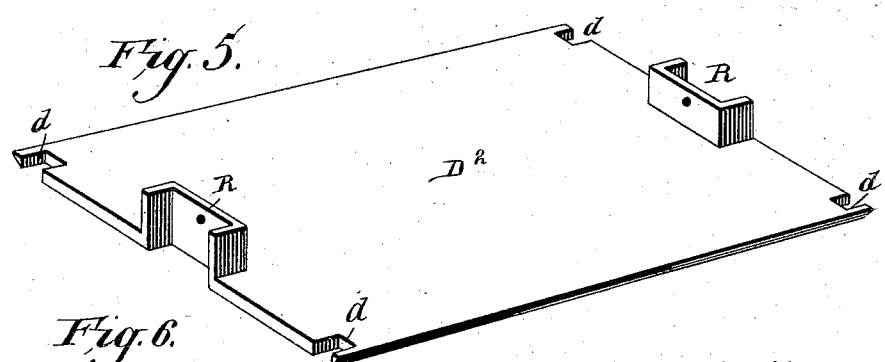
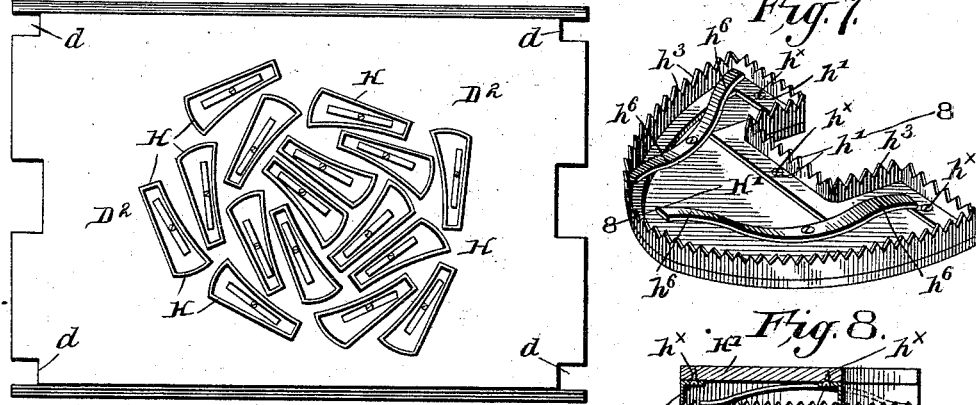
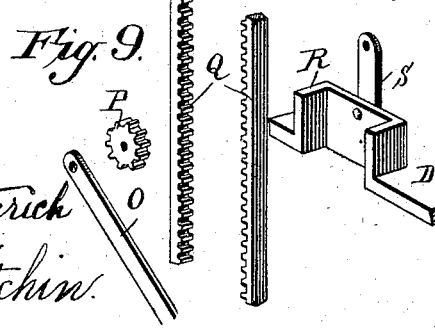
INVENTOR
Edouard Van Osta (No Model.) 5 Sheets—Sheet 5.
E. VAN OSTA.
LEATHER CUTTING MACHINE.
No. 558,864. Patented Apr. 21, 1896.
Fig. 10.
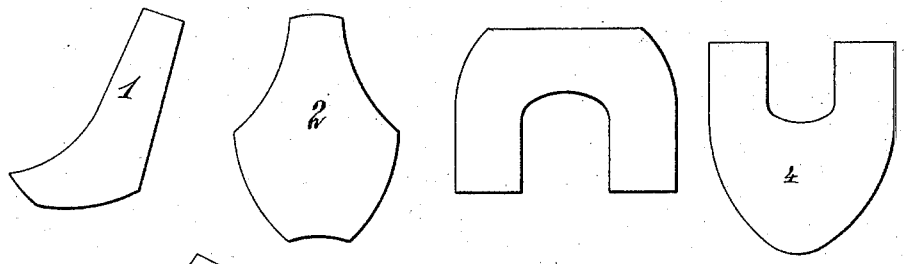
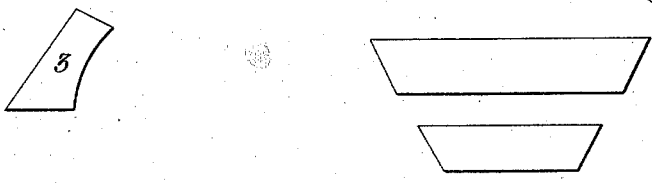
Fig. 11.
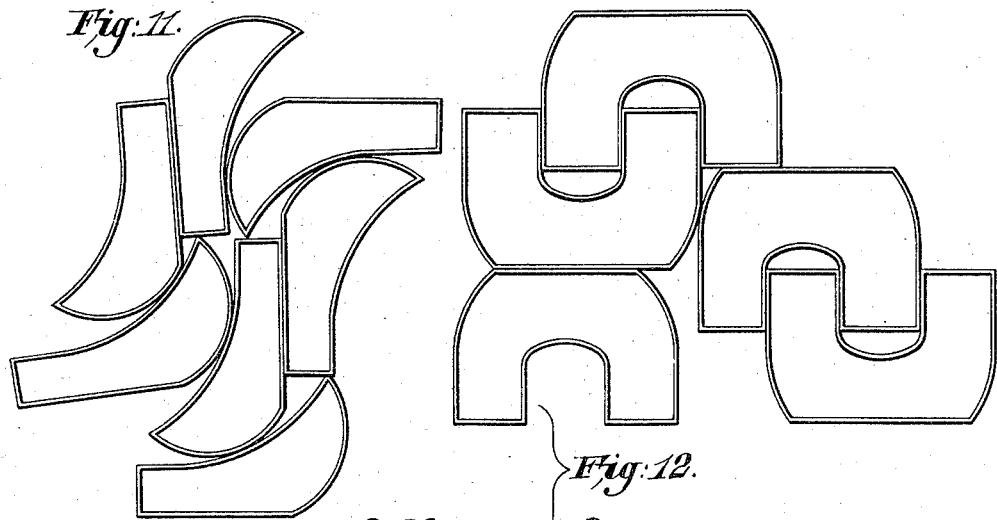
Fig. 12.
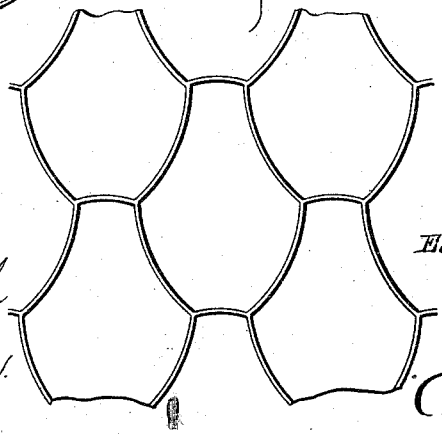
WITNESSES:
H. J. Dieterich
A. L. Kitchin
INVENTOR
Edouard Van Osta
BY O'Meara & Co.
ATTORNEYS

UNITED STATES PATENT OFFICE.

EDOUARD VAN OSTA, OF LOUISVILLE, KENTUCKY.

LEATHER-CUTTING MACHINE.

SPECIFICATION forming part of Letters Patent No. 558,864, dated April 21, 1896.

Application filed August 7, 1895. Serial No. 558,573. (No model.)

*To all whom it may concern:*

Be it known that I, EDOUARD VAN OSTA, residing at Louisville, in the county of Jefferson and State of Kentucky, have invented a new and Improved Leather-Cutting Machine, of which the following is a specification.

My invention is in the nature of a leather-cutting machine adapted for cutting the uppers for boots and shoes; and it primarily has for its object to provide a machine of this character of a very simple and inexpensive construction, of great capacity, which can be easily manipulated, and will effectively serve for its intended purposes.

The invention also has for its object to provide a machine of this kind having interchangeable dies or cutters so arranged that the machine can be quickly adjusted or set to cut uppers, gussets, &c., of different shapes, and also for cutting different-sized skins.

Furthermore, it has for its object to provide a simplified arrangement of drive-gear mechanism which will serve, through the continuous rotary motion of the main drive-shaft, to transmit a continuous reciprocating motion to a main follower or die-plate, which will quickly cut a number of skins at one time, whereby to produce a large quantity of cuttings of the desired shape at each downward thrust of the cutter or die plate.

With other objects in view, which hereinafter will appear, the invention consists in such novel features of construction and peculiar combination of parts, such as will be first described in detail, and then particularly pointed out in the appended claims, reference being had to the accompanying drawings, in which—

Figure 1:
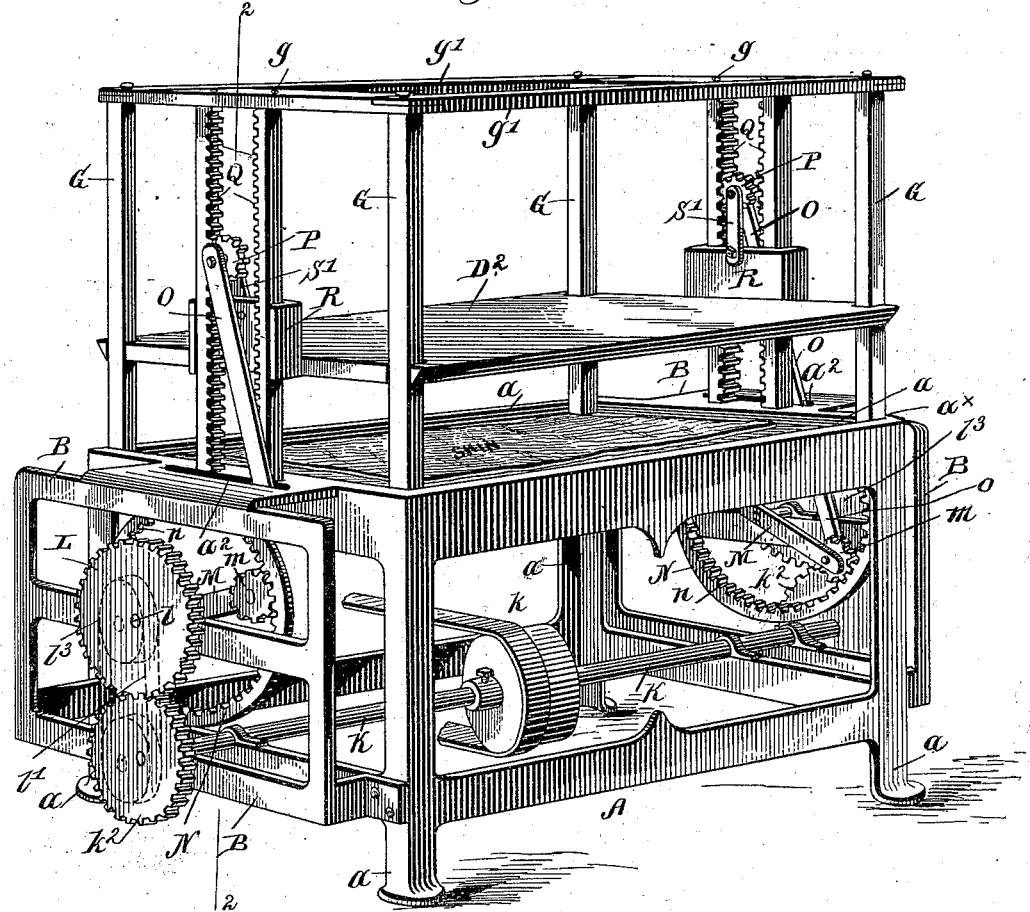
Figure 2:
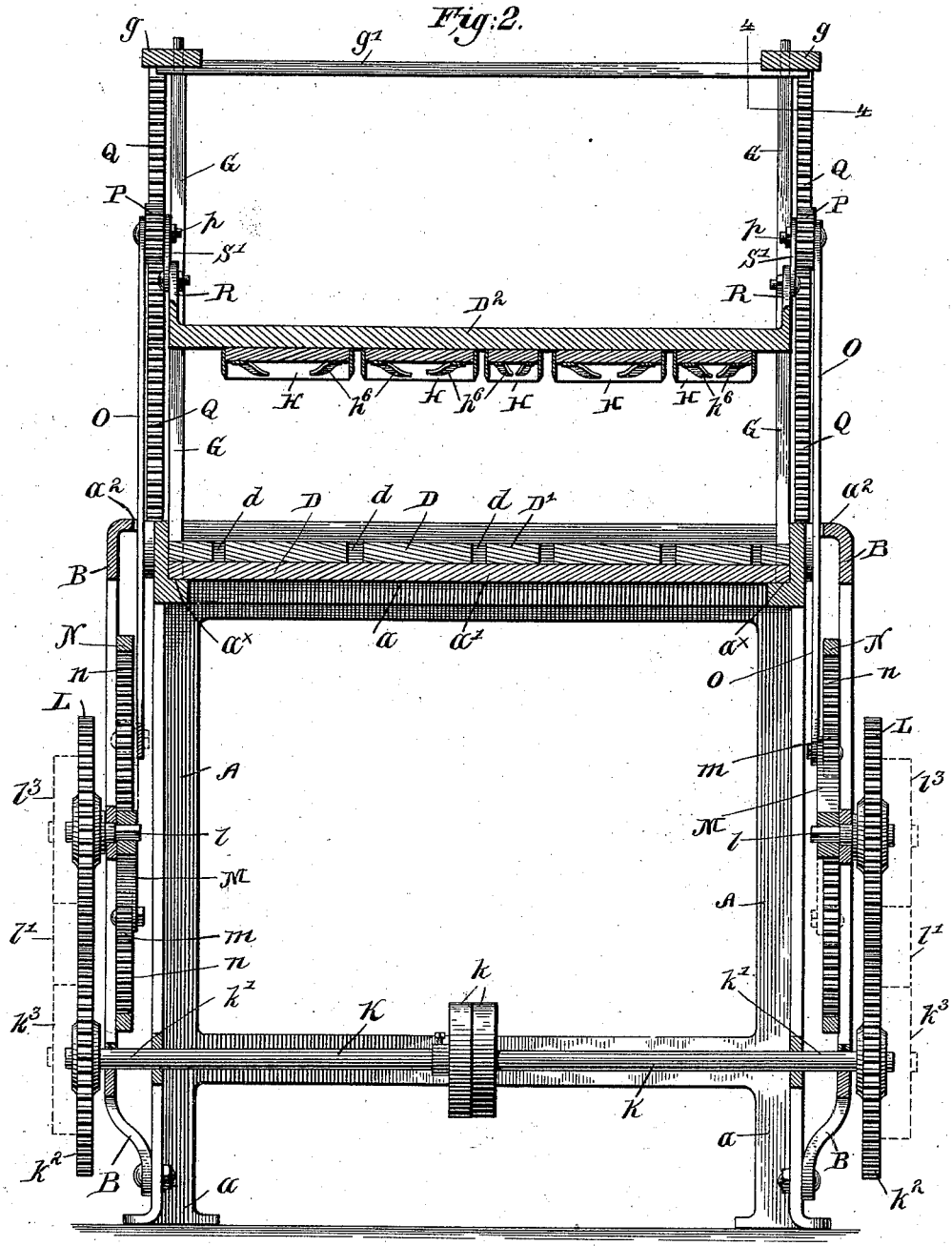
Figure 3:
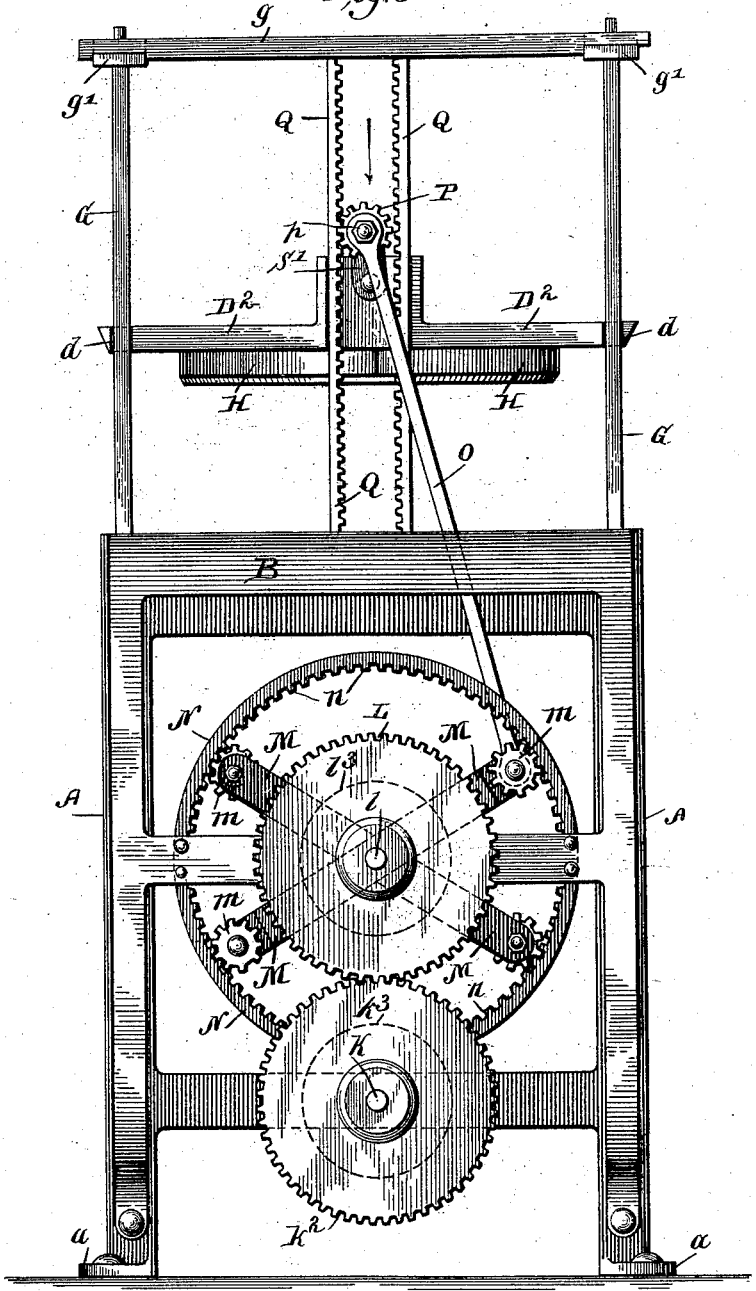
Figure 7A:
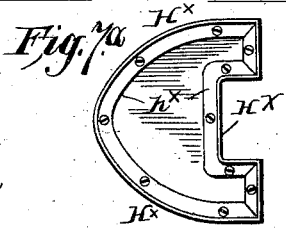

Figure 1 is a perspective view of my improved leather-cutting machine, the same being shown in position for use. Fig. 2 is a vertical longitudinal section of the same, taken practically on the line 2 2 of Fig. 1. Fig. 3 is an end view of my improved machine. Fig. 4 is a top plan view, partly in horizontal section, taken on the line 4 4 of Fig. 2. Fig. 5 is a perspective view of the die or follower plate. Fig. 6 is an inverted plan view thereof. Fig. 7 is a perspective view of one of the cutting-die sections. Fig. 7ª is a modified form of cutter hereinafter specifically referred to. Fig. 8 is a transverse section taken on the line 8 8 of Fig. 7. Fig. 9 is a view illustrating the double rack, the guide on the follower, and the reciprocating or traveler gear devices hereinafter referred to. Fig. 10 illustrates by a series of diagrams some of the shapes of uppers cut by my improved machine, and Figs. 11 and 12 are diagrammatic views illustrating several forms of nests of dies hereinafter specifically referred to.

In the practical construction my improved machine comprises a main frame A of substantially the shape shown in Fig. 1, it, for economy, being preferably made of cast-iron framing, consisting of the legs $a\ a$, the bed portion $a'$, having endwise-projecting slotted brackets $a^2\ a^2$ and end supplemental frame portions B B, in which is held the power-transmitting mechanism, the particular construction of which will hereinafter be particularly referred to. At the four corners of the bed portion $a'$ are formed in the angle portions thereof seats $a^\times\ a^\times$, upon which is supported the detachable lower or bed die D, which is of a size to snugly fit into the bed portion $a'$, and preferably with its upper face flush with the top edge of the said bed portion, as shown. To the said bed-plate D is secured, detachably, a series of fixed or bed dies D', arranged in nests, and in such a manner as to obtain the greatest amount of cuttings from a single skin with a minimum amount of waste. These dies, it should be stated, are usually formed in a nest sufficient for operating on the largest-sized skins, and in such a manner that one or more of such dies, as also some of the upper cutting-dies presently referred to, may be removed, as the size of the skin may require.

G G indicate four upright posts or guide members, which extend up from the seat portions $a^\times\ a^\times$ at the corners of the bed-plate, the upper ends of which are connected by the longitudinal brace-bars $g\ g$ and transverse members $g'\ g'$, as clearly shown in Fig. 1, such bars $g$ and $g'$ being detachably connected with the guides G, to permit of the removal of the upper die or follower plate D, which plate, it will be noticed by reference to the drawings, has the corners cut out or recessed, as at $d$, whereby such plate will be guided and held in place.

The plate D has detachably secured upon its under face a series of cutters or dies H, which are arranged in a nest, each cutter, however, being independently secured, whereby one or more may be removed as the sizes of the skins to be cut may require.

In practice each machine is supplied with a number of male or fixed dies D' and female or cutter dies H, which are made in the various shapes required for cutting the different shapes of uppers, gussets, &c., usually most generally used in boot and shoe making—such, for instance, as shown diagrammatically in Fig. 10. In all shapes, however, the upper or female cutters are constructed substantially as shown in Figs. 7 and 8, by reference to which it will be seen the same comprises a series of angle members, the horizontal portions of which have apertures $h'$, whereby they can be conveniently secured to the plate H' by the flat-head screws $h^\times$, while their pendent or vertical members have their cutting edge serrated, as at $h^3$, to render them more effective for cutting the skin. It will also be noticed by reference to the aforesaid Figs. 7 and 8 that one or more ejectors are secured to the bottom of the plate H, which in the preferred form are in the nature of flat leaf-springs $h^6$, centrally pivoted, having their ends bent to form flat shoe or bearing portions to engage the leather, such flat ends serving to bear against the leather in such a way as not to mar or deface it as they eject the cut skins from engagement with the upper die after each cutting operation.

I prefer to connect the cutters to supplemental plates H', so that they can be the more readily attached to the follower or upper cutter-plate.

Instead of making the cutters of a series of angle plates the same may be made of a single steel strip $H^\times$, (see Fig. 7$^a$,) bent around the edges of the form $h^\times$ and secured thereto by screws or otherwise.

As before stated, the upper plate is held for vertical reciprocation on the guides G G, and for such purposes I provide peculiar and simple arrangement of gear mechanism, driven by a main power-shaft, which mechanism is best illustrated in Figs. 1, 2, and 3. In the aforesaid figures K indicates the main or power shaft, journaled longitudinally at the lower end of the frame A and provided with a band-wheel $k$, as shown. This shaft K projects at each end of the frame, as at $k'$ $k$, and has secured thereto gears $k^2$ $k^2$, as shown in full lines, or band-pulleys $k^3$ $k^3$, as indicated in dotted lines, which gears $k^2$ $k^2$ are held to mesh with gears L on short shafts $l$, journaled in the supplemental end frame portions.

Instead of providing the gears $k^2$ and L the shaft $l$ can be driven by the belts $l'$, which pass over the pulleys $k^3$, and similar pulleys $l^3$ on the shafts $l$, as indicated in dotted lines.

The shafts $l$ carry on their inner ends transverse bars M, which have each a pair of cog-gears $m$ $m$, one on each end, which mesh with the cog-teeth $n$ of the internally-geared annular rims N, which are fixedly held on the inner faces of the supplemental frame-sections, such rims forming, as it were, annular trackways over which the gears $m$ are held to travel.

O O indicate a pair of link-bars, which have their lower ends, pivotally connected with the cross-bars M, pass up through the slotted-end extensions of the main frame and have at their upper ends on their inner faces cogs P P, which are adapted to alternately engage the opposite rack-guides Q Q. These guides Q Q, it will be noticed, are formed each of a pair of vertical bars at the ends of the bed portion of the main frame, the upper ends being braced by and held in the upper transverse bars, as shown. These rack-guides have their rack-faces so spaced apart that as the cogs proceed upward they can engage the cogs on one side and freely rotate, and as they move in an opposite direction engage the opposite rack-faces.

It will be observed that by referring more particularly to Fig. 5 the upper die or follower-plate has vertically-projected guide portions at its ends, which have lapping side portions R R, which lap over the sides of the guides Q Q and serve to form ways which will not alone brace and hold the rack-bars which constitute the guides Q in place, but will also serve to properly guide the follower-plate in its reciprocal movements.

The short shafts $p$, on which the cogs P are journaled, are extended inward and form the upper pivots for the link members S', the lower ends of which are pivotally connected with the ends of the upper or reciprocal plate, as most clearly shown in Fig. 2.

So far as described it will be readily understood that as the main drive-shaft is rotated the bars M will also be rotated and held to a regular rotary motion by their cog-gear connection with the fixed annular cog-tracks N, and as such arms M are rotated it is obvious that the link-bars O will receive a reciprocating movement thereby, which is utilized to impart vertical reciprocating movement to the gears P and through them to the upper die or follower. It will be also readily apparent that as the bars O O are connected near one end of the arms M they will, by gravity, lean inward toward the center of such arms. Thus should the line or pivot-point of such bars O be to the right of the center of the arms M, as shown in Fig. 1, the gears P would be dropped over to engage the rack-face at the left of the guides Q, such gears being held in engagement with such face by the weight of the bars O and the upper follower. (See arrow indicating line of weight-pull in Fig. 3.) Assuming now the follower to be on its downward position, as soon as the arms M reach a vertical position the gears P will be at the lowermost point between the rack-faces of the guides Q Q. Now as the arms M continue in their movement to bring the pivot end of the bars O to the left of the center the upper ends, with the gears P, will fall over by gravity to engage the right-hand face of the guides to engage the same as they (the bars) move upward. Thus it will be seen that by constructing and arranging the several parts as described one complete revolution of the shafts *l l* will have caused a complete reciprocal movement of the follower or upper die-plate. Furthermore, as a continuous reciprocal motion from a rotary shaft is attained at all times, it follows that as the speed at which the follower travels up and down is slow the operator will have ample time to withdraw the cuttings and place in position new skins to be cut without at any time reversing or stopping the operation of the machine for such purpose.

By connecting the reciprocating mechanism with the plate F in the manner stated the same will have a positive and effective connection therewith, and can, owing to the simple form of connection, be quickly disconnected when required, whereby when it is intended to change the machine—be it to cut uppers, quarters, or gussets—all that will be necessary is to detach the upper longitudinal and cross bars and disconnect the end guides of the follower from the reciprocating devices and lift it up out of engagement with the vertical guides G, and a new follower with cutters, or new cutters fitted to the removed follower, as may be desired.

Ordinarily each machine is supplied with eighteen plates and eighteen patterns, which will produce all the sizes of footwear in general demand, one machine thus equipped serving to cut all the sizes required.

It should be stated that in the practical operation of the machine two or more skins can be cut at one time.

Among other advantages a machine constructed as above described will produce patterns more uniform and more economically than could possibly be done by hand, and as, for example, when a cut such as shown in Fig. 10 is made the parts can be sewed together and the same pricked more practically, as cambering is avoided.

No. 2, Fig. 10, shows an upper which in use will require cambering. No. 3 shows a cutting of that part of the skin left between cuttings 1 and 2, and forms the rear part of the shoe. These small parts can, if desired, be cut from the waste-pieces by hand. No. 4 shows a cutting especially adapted for use on "galoshes," the same being of one piece.

It is obvious that the dies and cutters can be formed to cut any pattern required for boot and shoe wear, and that the details of construction may be modified and changed without departing from or going beyond the scope of the appended claims.

It should be stated that the annular rims N, having internal racks, serve a very important purpose in that they keep the arms M at all times in a uniform condition and render the reciprocative movement of the upper follower uniform and regular. This would not be the case were the arms M left free for independent movement at each end, as the irregular weight at each end would serve to depress the said arms unequally.

Having thus described my invention, what I claim, and desire to secure by Letters Patent, is—

1. In a leather-cutting machine, the combination with main frame, having supplemental end portions of the operating mechanism arranged in said frame and end portions, the die-bed and lower die, the guide-frame, mounted upon the main frame, the central end guides, the follower and guides upon the under side thereof and the pitmen connecting said follower with the driving mechanism all arranged substantially as shown and described.

2. In a machine of the character described, the combination with the main frame having a bed portion formed with a seat, upright guides at the four corners thereof, and upright guides at the ends centrally between the corner guides, of a stationary male die or cutter holding plate supported on the seats of the bed portion of the frame, a vertically-reciprocating female-die-carrying plate, detachably fitted to reciprocate between the corner guides, and having end guide members held to lap the central end guides, vertically-reciprocating pitman-bars pivotally connected to the said end guide members of the reciprocating die-plate and mechanism for reciprocating the said bars all arranged substantially as shown and for the purposes described.

3. The combination with the main frame, the lower or fixed die-plate held thereon, the vertical guides therefor, and the end double-rack guides, of the upper or reciprocating die or cutter carrying plate, a rotary drive mechanism and intermediate connections joining the rotary mechanism and the reciprocating die-plate such connection including gravity-operated pitman-arms adapted to automatically alternately engage the opposing faces of the double-rack guides, whereby to impart a reciprocal movement to the upper die-plate as hereinbefore described.

4. In a machine as described, the combination with the main frame the lower or fixed die-plate said main frame having vertical guides at the corners, and double-face rack-guides at the ends, of the upper or reciprocating die-plate, the rotary drive-shafts at the end of the frame carrying cross-arms M on their inner ends, a main drive-shaft geared with the said end drive-shafts, the pitman-bars eccentrically and pivotally connected at their inner ends to the cross-arms M their upper ends having a pinion alternately adapted to drop over into engagement with the opposing rack-faces of the double-rack guides, and link-arm connections joining the upper ends of the said bars with the ends of the upper die-holder or follower-plate, all arranged substantially as shown and for the purposes described.

5. In a leather-cutting machine as described the combination, with the main frame, the main drive-shaft, the lower or fixed die-plate, the vertical corner-guides, and the double-rack end guides, of the upper or movable die-plate guided in the vertical corner-guides, and having end portions held to lap over the outer edge of the double-rack guides, the end shafts $l$, carrying cross-arms M, and drive-gear connections between such shafts $l$ and the end shafts, and the pitman-bars O eccentrically pivoted on their lower ends to the bars M, their upper ends having spur-wheels adapted to alternately engage the opposing faces of the double-rack guides, and the link members connecting the upper ends of the bars O and the ends of the movable die-plate all arranged substantially as shown and for the purposes described.

6. The combination with the main frame provided with vertical corner-guides and having supplemental end frame-sections, each having an annular, internally-toothed rim fixedly connected therewith, the main drive-shaft journaled in the main frame, the shafts $l$ journaled in the supplemental frame-sections, having cross-arms M on their inner ends, said arms having spur-wheels, at their ends held to mesh with the annular toothed rims, and the drive-gear connections between the main and supplemental drive-shafts, of the lower or fixed bed die-plate, the upper die-plate held to reciprocate between the vertical guides, the double-rack guides, the pitman-rods O pivoted eccentrically at the lower ends to the cross-arms M and carrying spur-wheels at their upper ends adapted to be alternately moved into contact with the opposing faces of the double rack by gravity and the link-arm connections between the upper ends of the said bars O and the ends of the upper or follower die-plate all arranged substantially as shown and for the purposes described.

EDOUARD VAN OSTA.

Witnesses:
C. GERILLE,
GREGORY PHELAN.